US012524675B2

(12) United States Patent
Dhandapani et al.

(10) Patent No.: US 12,524,675 B2
(45) Date of Patent: *Jan. 13, 2026

(54) SEMICONDUCTOR FABRICATION USING MACHINE LEARNING APPROACH TO GENERATING PROCESS CONTROL PARAMETERS

(71) Applicant: Applied Materials, Inc., Santa Clara, CA (US)

(72) Inventors: Sivakumar Dhandapani, San Jose, CA (US); Jun Qian, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 1629 days.

This patent is subject to a terminal disclaimer.

(21) Appl. No.: 16/136,868

(22) Filed: Sep. 20, 2018

(65) Prior Publication Data

US 2019/0095797 A1 Mar. 28, 2019

Related U.S. Application Data

(60) Provisional application No. 62/562,986, filed on Sep. 25, 2017.

(51) Int. Cl.
*G06N 3/08* (2023.01)
*B24B 37/005* (2012.01)
(Continued)

(52) U.S. Cl.
CPC .......... *G06N 3/084* (2013.01); *B24B 37/005* (2013.01); *B24B 37/20* (2013.01); *B24B 37/32* (2013.01);
(Continued)

(58) Field of Classification Search
None
See application file for complete search history.

(56) References Cited

U.S. PATENT DOCUMENTS 6,439,964 B1  8/2002  Prahbu et al.
6,540,591 B1  4/2003  Pasadyn et al.
(Continued)

FOREIGN PATENT DOCUMENTS

CN  1554118  12/2004
CN  202264145  6/2012
(Continued)

OTHER PUBLICATIONS

Office Action in Taiwanese Appln. No. 107131990, dated Mar. 3, 2022, 10 pages (with English search report).
(Continued)

*Primary Examiner* — Sylvia Macarthur
(74) *Attorney, Agent, or Firm* — Fish & Richardson P.C.

(57) ABSTRACT

A method for processing substrates includes subjecting each respective first substrate of a first plurality of substrates to a process that modifies a thickness of an outer layer of the respective first substrate, generating a plurality of groups of process parameter values; generating a plurality of removal profiles, training an artificial neural network by backpropagation using the plurality of groups of process parameter and plurality of removal profiles as training data where the artificial neural network has a plurality of input nodes to receive respective removal values from the removal profile and a plurality of output nodes to output control parameter values, for each respective second substrate of a second plurality of substrates determining a target removal profile, determining respective control parameter values to apply by applying the target removal profile to the input nodes, and subjecting each respective second substrate to the process using the respective control parameter values.

8 Claims, 5 Drawing Sheets

(51) Int. Cl.
  *B24B 37/20* (2012.01)
  *B24B 37/32* (2012.01)
  *G06N 3/084* (2023.01)
  *H01L 21/321* (2006.01)
  *H01L 21/66* (2006.01)
  *H01L 21/67* (2006.01)

(52) U.S. Cl.
  CPC .... *H01L 21/3212* (2013.01); *H01L 21/67253* (2013.01); *H01L 22/20* (2013.01); *H01L 22/26* (2013.01); *H01L 22/12* (2013.01)

(56) References Cited

U.S. PATENT DOCUMENTS

| | | | |
|---|---|---|---|
| 6,544,103 | B1 | 4/2003 | Korovin |
| 6,594,024 | B1* | 7/2003 | Singh ................ G01N 21/47 451/6 |
| 6,932,671 | B1 | 8/2005 | Korovin et al. |
| 7,001,243 | B1 | 2/2006 | Yi et al. |
| 7,037,172 | B1 | 5/2006 | Molnar et al. |
| 7,115,017 | B1 | 10/2006 | Laursen et al. |
| 7,160,739 | B2 | 1/2007 | Shanmugasundram et al. |
| 7,326,103 | B2 | 2/2008 | Lao et al. |
| 7,628,905 | B2* | 12/2009 | Manens ............... B24B 37/042 205/641 |
| 7,822,500 | B2 | 10/2010 | Kobayashi et al. |
| 8,246,417 | B2 | 8/2012 | Kobayashi et al. |
| 8,396,582 | B2 | 3/2013 | Kaushal et al. |
| 8,774,958 | B2* | 7/2014 | Zhang ................. G05B 19/182 451/5 |
| 9,213,340 | B2 | 12/2015 | Zhang et al. |
| 9,754,846 | B2 | 9/2017 | Lu et al. |
| 10,732,607 | B2* | 8/2020 | Cherian ............... G05B 19/406 |
| 2002/0193899 | A1 | 12/2002 | Shanmugasundram et al. |
| 2004/0023606 | A1 | 2/2004 | Wang et al. |
| 2005/0020185 | A1 | 1/2005 | Zuniga et al. |
| 2005/0070205 | A1 | 3/2005 | Korovin et al. |
| 2006/0009127 | A1 | 1/2006 | Sakurai |
| 2006/0265097 | A1* | 11/2006 | Roberts ............... G03F 7/70633 700/121 |
| 2007/0102116 | A1 | 5/2007 | Shanmugasundram et al. |
| 2007/0143234 | A1* | 6/2007 | Huang ..................... G03F 1/36 706/15 |
| 2007/0224915 | A1 | 9/2007 | David et al. |
| 2007/0232045 | A1 | 10/2007 | Lally et al. |
| 2007/0249071 | A1 | 10/2007 | Lian et al. |
| 2008/0119119 | A1 | 5/2008 | Zuniga et al. |
| 2008/0170241 | A1 | 7/2008 | Chard et al. |
| 2010/0035520 | A1 | 2/2010 | Tanaka et al. |
| 2010/0129939 | A1 | 5/2010 | David et al. |
| 2010/0138026 | A1 | 6/2010 | Kaushal et al. |
| 2012/0277897 | A1 | 11/2012 | Zhang et al. |
| 2013/0148130 | A1 | 6/2013 | Li et al. |
| 2014/0032463 | A1* | 1/2014 | Jin ........................ G06N 3/08 706/25 |
| 2016/0132042 | A1* | 5/2016 | Wu .................. G05B 19/41875 700/121 |
| 2016/0148850 | A1 | 5/2016 | David |
| 2017/0109646 | A1* | 4/2017 | David ..................... G03F 7/705 |
| 2017/0193400 | A1 | 7/2017 | Bhaskar et al. |
| 2018/0150052 | A1* | 5/2018 | Cherian ................ G06N 3/0454 |
| 2018/0207768 | A1 | 7/2018 | Shibuya et al. |
| 2018/0304435 | A1* | 10/2018 | Xu ......................... G06N 3/084 |
| 2019/0095797 | A1* | 3/2019 | Dhandapani ........... H01L 22/20 |
| 2022/0347813 | A1* | 11/2022 | Osterheld ............. B24B 37/005 |

FOREIGN PATENT DOCUMENTS

| | | |
|---|---|---|
| JP | H04-65632 | 3/1992 |
| JP | 2001-060572 | 3/2001 |
| JP | 2006-043873 | 2/2006 |
| JP | 2011-098436 | 5/2011 |
| JP | 2017-520124 | 7/2017 |
| JP | 2018-118372 | 8/2018 |
| KR | 10-2007-0118279 | 12/2007 |
| KR | 10-2012-0123493 | 11/2012 |
| KR | 10-2016-0103791 | 9/2016 |
| TW | 200607604 | 3/2006 |
| TW | 200822204 | 5/2008 |
| TW | 201734825 | 10/2017 |
| WO | WO 2008/032753 | 3/2008 |

OTHER PUBLICATIONS

Office Action in Japanese Appln. No. 2020-516913, dated Jun. 29, 2021, 6 pages (with English translation).
KR Office Action in Korean Appln. No. 10-2020-7011805, dated May 28, 2021, 21 pages (with English Summary).
Bae et al., "Effect of Retainer Pressure on Removal Profile and Stress Distribution in Oxide CMP", Nov. 19-21, 2009, International Conference on Planarization/CMP Technology, Fukuoka, 5 pages.
International Search Report and Written Opinion in International Application No. PCT/US2018/052001, mailed on Jan. 17, 2019, 15 pages.
Office Action in Korean Appln. No. 10-2020-7011805, dated Jan. 20, 2022, 21 pages (with English summary).
Fan et al., "Study on applications of CMAC neural network in optical processing with stressed-lap," Opto-Electronic Engineering, Dec. 2002, 29(6):9(abstract only).

\* cited by examiner

SEMICONDUCTOR FABRICATION USING MACHINE LEARNING APPROACH TO GENERATING PROCESS CONTROL PARAMETERS

CROSS-REFERENCE TO RELATED APPLICATIONS

This application claims priority to U.S. Application Ser. No. 62/562,986, filed on Sep. 25, 2017, the entire disclosure of which is incorporated by reference.

TECHNICAL FIELD

The present disclosure relates to controlling an integrated circuit fabrication process, e.g., a chemical mechanical polishing process.

BACKGROUND

An integrated circuit is typically formed on a substrate by the sequential deposition of conductive, semiconductive, or insulative layers on a silicon wafer. One fabrication step involves depositing a filler layer over a non-planar surface and planarizing the filler layer. For some applications, the filler layer is planarized until the top surface of a patterned layer is exposed. For example, a conductive filler layer can be deposited on a patterned insulative layer to fill the trenches or holes in the insulative layer. After planarization, the portions of the conductive layer remaining between the raised pattern of the insulative layer form vias, plugs, and lines that provide conductive paths between thin film circuits on the substrate. For other applications, the filler layer is planarized until a predetermined thickness is left over an underlying layer. For example, a dielectric layer deposited can be planarized for photolithography.

Chemical mechanical polishing (CMP) is one accepted method of planarization. This planarization method typically requires that the substrate be mounted on a carrier head. The exposed surface of the substrate is typically placed against a rotating polishing pad with a durable roughened surface. The carrier head provides a controllable load on the substrate to push it against the polishing pad. A polishing liquid, such as a slurry with abrasive particles, is typically supplied to the surface of the polishing pad. The processed wafer exhibits a material removal profile, a two dimensional map of the change in a polished layer's thickness after the polishing process.

SUMMARY

In one aspect, a method of processing substrates includes: subjecting each respective first substrate of a first plurality of substrates to a process that modifies a thickness of an outer layer of the respective first substrate; for each respective first substrate, recording a group of process parameter values used for the process, thus generating a plurality of groups of process parameter values; for each respective first substrate, measuring a removal profile of the outer layer during or after the process with a monitoring system, thus generating a plurality of removal profiles; training an artificial neural network by backpropagation using the plurality of groups of process parameter and plurality of removal profiles as training data, the artificial neural network having a plurality of input nodes to receive respective removal values from the removal profile, a plurality of output nodes to output control parameter values, and a plurality of hidden nodes connecting the input nodes to the output nodes; for each respective second substrate of a second plurality of substrates, determining a target removal profile; for each respective second substrate, determining respective control parameter values to apply to the respective second substrate from the output nodes of the artificial neural network by applying the target removal profile to the input nodes of the artificial neural network; and subjecting each respective second substrate to the process using the respective control parameter values.

In another aspect, a computer program product for controlling processing of a substrate, the computer program product tangibly embodied in a non-transitory computer readable medium, includes instructions for causing a processor to: train an artificial neural network by backpropagation using a plurality of groups of process parameter and a plurality of removal profiles as training data, the artificial neural network having a plurality of input nodes to receive respective removal values from a removal profile, a plurality of output nodes to output control parameter values, and a plurality of hidden nodes connecting the input nodes to the output nodes; obtain a target removal profile for each respective substrate of a plurality of substrates; for each respective substrate, determine respective control parameter values to apply to the respective substrate from the output nodes of the artificial neural network by applying the target removal profile to the input nodes of the artificial neural network; and cause a semiconductor processing system to subject each respective substrate to the process using the respective control parameter values.

In yet another aspect, a polishing system includes: a support to hold a polishing pad; a carrier head to hold a substrate in contact with the polishing pad, the carrier head having a plurality of chambers; a motor to generate relative motion between the support and the carrier head; and a controller configured to: train an artificial neural network by backpropagation using a plurality of groups of process parameter and a plurality of removal profiles as training data, the artificial neural network having a plurality of input nodes to receive respective removal values from a removal profile, a plurality of output nodes to output control parameter values, and a plurality of hidden nodes connecting the input nodes to the output nodes, wherein the control parameter values include pressures for the chambers in the carrier head; obtain a target removal profile for each respective substrate of a plurality of substrates; for each respective substrate, determine respective control parameter values to apply to the respective substrate from the output nodes of the artificial neural network by applying the target removal profile to the input nodes of the artificial neural network, wherein the respective control parameter values include respective pressures for the chambers in the carrier head; and for each respective substrate, cause the carrier head to apply the respective pressures to the chambers in the carrier head during polishing.

Implementations may include one or more of the following features.

The process may include chemical mechanical polishing. The control parameter values may include pressures of chambers in a carrier head to hold a substrate against a polishing pad.

At least some of the input nodes of the artificial neural network may be configured to receive state parameter values. The state parameter values may include one or more of a retaining ring life, or a polishing pad life. The control parameter values may include one or more of a platen rotation rate, carrier head rotation rate, or polishing time.

The monitoring system may include an in-line metrology system. The in-line metrology system may include an optical monitoring system.

The determining of the target removal profile may include storing a desired thickness profile, receiving a measured thickness profile of the respective second substrate, and determining a difference between the measured thickness profile and the desired thickness profile. The receiving of the measured thickness profile may include measuring a thickness profile of the respective second substrate with the monitoring system.

Certain implementations may have one or more of the following advantages. Control parameter convergence may be achieved more rapidly. Within-wafer thickness non-uniformity and wafer-to-wafer thickness non-uniformity (WIWNU and WTWNU) may be reduced. Product wafers may be used for model refinement, leading to the actual profile of processed substrates being closer to a desired profile. Complex behavior of the polishing process in response to polishing parameters may be accounted for without explicit knowledge of the functional relationships.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

One challenge in CMP is developing a process model that is able to predict a material removal profile as a function of multiple input parameters. Input parameters may include variations in the initial thickness of a substrate layer, a target material removal profile, the polishing pad condition, the retaining ring condition, the relative speed between the polishing pad and a substrate, and the applied pressure on a substrate. Furthermore, the CMP process is a dynamical system in which surface topology is constantly changing as a function of time during the process, which in turn affects the process behavior. The complex relationship of input parameters with the material removal profile and the dynamic nature of a CMP process contribute to the challenge of developing a process model of the polishing process.

Figure 1:
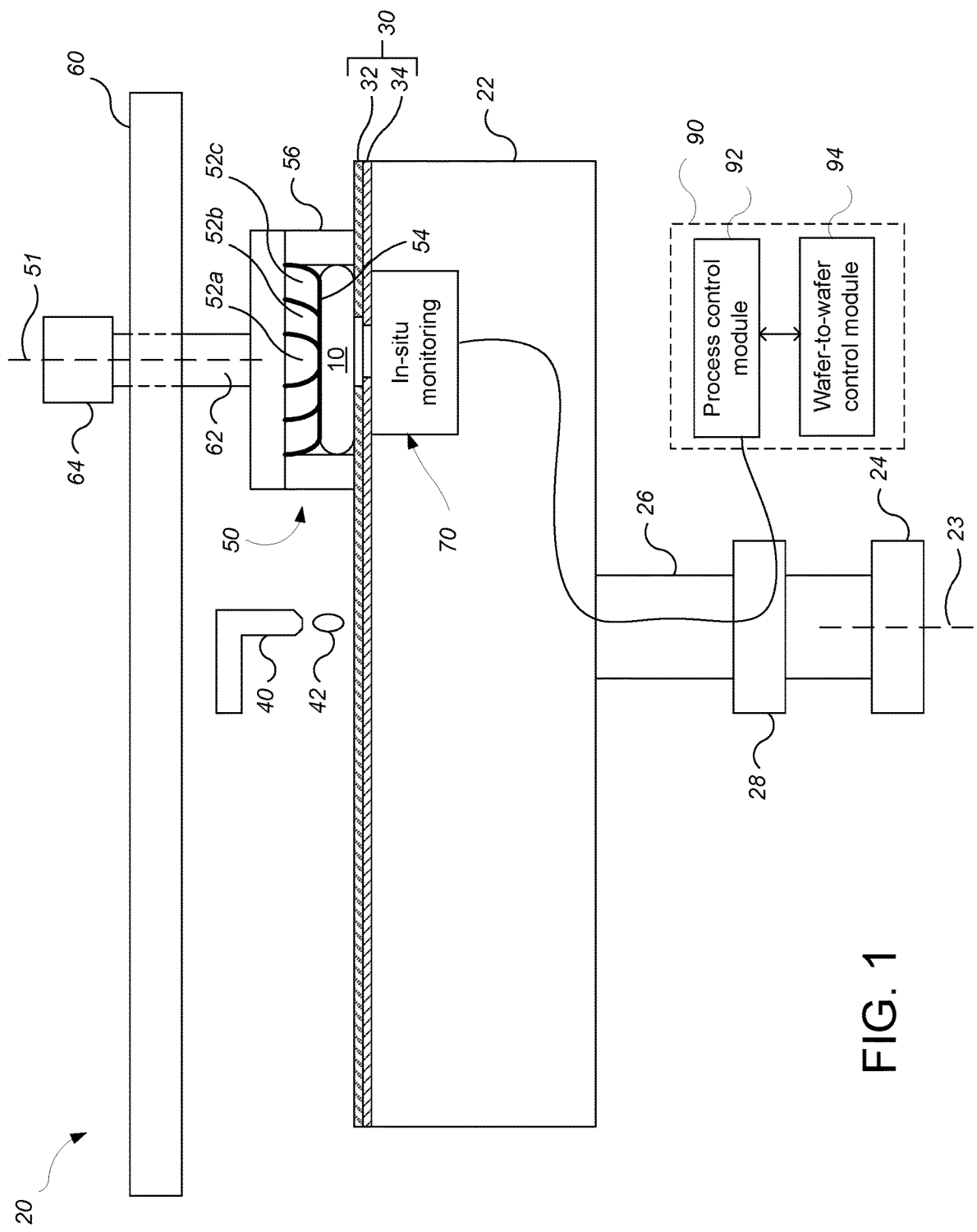
FIG. 1 illustrates a schematic cross-sectional view of an example of a polishing apparatus.

FIG. 1 illustrates an example of a polishing apparatus 20. The polishing apparatus 20 can include a rotatable disk-shaped platen 22 on which a polishing pad 30 is situated. The platen is operable to rotate about an axis 23. For example, a motor 24 can turn a drive shaft 26 to rotate the platen 22. The polishing pad 30 can be detachably secured to the platen 22, for example, by a layer of adhesive. The polishing pad 30 can be a two-layer polishing pad with an outer polishing layer 32 and a softer backing layer 34.

The polishing apparatus 20 can include a polishing liquid supply port 40 to dispense a polishing liquid 42, such as an abrasive slurry, onto the polishing pad 30. The polishing apparatus 20 can also include a polishing pad conditioning disc to abrade the polishing pad 30 to maintain the polishing pad 30 in a consistent abrasive state.

Figure 2:
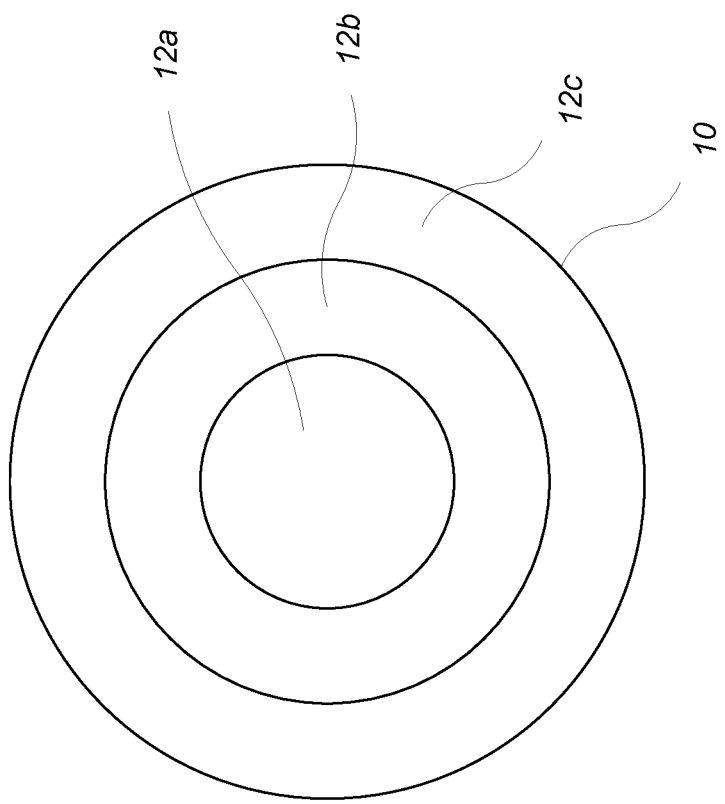
FIG. 2 illustrates a schematic top view of a substrate having multiple zones.

A carrier head 50 is operable to hold a substrate 10 against the polishing pad 30. Each carrier head 50 also includes a plurality of independently controllable pressurizable chambers, e.g., three chambers 52a-52c, which can apply independently controllable pressurizes to associated zones 12a-12c on the substrate 10 (see FIG. 2). Referring to FIG. 2, the center zone 12a can be substantially circular, and the remaining zones 12b-12c can be concentric annular zones around the center zone 12a.

Returning to FIG. 1, the chambers 52a-52c can be defined by a flexible membrane 54 having a bottom surface to which the substrate 10 is mounted. The carrier head 50 can also include a retaining ring 56 to retain the substrate 10 below the flexible membrane 54. Although only three chambers are illustrated in FIGS. 1 and 2 for ease of illustration, there could be two chambers, or four or more chambers, e.g., five chambers. In addition, other mechanisms to adjust the pressure applied to the substrate, e.g., piezoelectric actuators, could be used in the carrier head 50.

Each carrier head 50 is suspended from a support structure 60, e.g., a carousel or track, and is connected by a drive shaft 62 to a carrier head rotation motor 64 so that the carrier head can rotate about an axis 51. Optionally each carrier head 50 can oscillate laterally, e.g., on sliders on the carousel, by motion along the track; or by rotational oscillation of the carousel itself. In operation, the platen 22 is rotated about its central axis 23, and the carrier head 50 is rotated about its central axis 51 and translated laterally across the top surface of the polishing pad 30.

The polishing apparatus 20 can include an in-line monitoring system for measuring a thickness of a polished layer upon completion of the polishing process. For example, the in-line monitoring system can generate a map of layer thicknesses over the zones 12a-12c. The measurements from the in-line monitoring system can be communicated to a controller 90. Examples of the in-line monitoring system include an optical monitoring system, e.g., a spectrographic monitoring system. A spectrographic monitoring system can measure a layer thickness value and an associated goodness of fit (GOF) value for each points of the layer thickness map. For example, a broadband light source can be used to illuminate a location on the layer, and the reflection containing an optical interference spectrum created by the layer, the substrate, and any other layers in between the two can be measured. The measured optical interference spectrum can be analyzed, for example, by fitting it with an equation that describes an optical interference spectrum generated by an expected stacking of films. The fitting produces a determination of the thickness of the layer and a GOF value that is indicative of how closely the measured spectrum agrees with the expected film stack. As such, the GOF value can be used as an indicator of reliability of the determined thickness value.

The controller 90 contains a tool control module 92 and an integrated advanced process control module (i-APC) 94. The tool control module 92 and the i-APC module 94 in combination may provide advanced process control functionalities, such as wafer-to-wafer uniformity control. The controller 90 can be a computing device that includes a microprocessor, memory and input/output circuitry, e.g., a programmable computer. Although illustrated with a single block, the controller 90 can be a networked system with functions distributed across multiple computers, and modules 92 and 94 can be located in the same computer or different computers.

The described polishing apparatus has many associated process parameters that control the operation of the polishing apparatus or describe the state of the apparatus or the polishing environment. Process parameters that control the operation of the polishing apparatus (and that can be set, at least initially, by the tool control module 92) ('control parameters') include the following: rotation rate of platen 22; rotation rate of carrier head 50; pressure of the chambers 52a-52c; and polishing time.

Process parameters that reflect the state of the apparatus or polishing environment ('state parameters') include the following: polishing retaining ring life; polishing pad life; polishing pad conditioning disc life; type of polishing pad; and type of polishing liquid ('slurry'). The retaining ring, pad, and conditioning disc are examples of consumable components ('consumables') within a polishing apparatus. The condition or 'life' of these consumables can be described, for example, as a count of wafers processed; actual wafer polishing time; or total time elapsed since installation.

A typical wafer to be polished by a CMP process has a layer of material with surface topologies to be planarized. A goal of the CMP process is to achieve a desired material removal profile, which is a one or two dimensional map of the change in a polished layer's thickness after the polishing process. The surface topologies vary from wafer-to-wafer due to different die designs having different underlying transistor and interconnect patterns, e.g. due to different pattern densities. These factors interact with the CMP process in a complex manner, which results in different polishing behavior between wafers with different die designs. Furthermore, even wafers with the same die design may have different polishing behaviors due to upstream process variations in deposition or etching. Therefore, different CMP control parameters are typically needed, at least for wafers with different die designs, and possibly for individual wafers with the same die design, to achieve a desired material removal profile. Material removal profiles sometimes have a radial dependence partly due to the axial symmetry and rotation of the polishing head. Accordingly, one control parameter that is often tuned to achieve a desired radial profile is the pressures of the radial chambers 52a-52c.

The polishing apparatus 20 can implement a wafer-to-wafer control. The wafer-to-wafer control can provide improved likelihood of achieving target material removal profiles over a wide range of designs and wafer non-uniformities. A wafer-to-wafer feedback control method uses information about previously processed substrates to improve processing of a subsequent substrate. The wafer-to-wafer feedback control method can be implemented by the i-APC module 94.

In an example implementation of the controller 90, the i-APC module 94 generates an initial set of control parameter values based on an initial process model, and provides the initial set of control parameters values to the tool control module 92. The tool control module 92 can then control the polishing system using the received control parameter values.

After processing of one or more substrates over a user defined period of time, data about the substrates can be used by the i-APC module 94 to improve the initial process model by generating a new process model or updating the initial process model. For example, the user defined period of time for generation of a new process model or updating of the initial process model can be measured in number of substrates polished, such as 5, 10, 25, or 100 wafers, or a "lot" of wafers (wafers are typically transported and processed in "lots"; a typical lot size is 25 wafers). As another example, the user defined period of time may be defined as a portion of a lifetime of a consumable, such as a polishing pad lifetime. Such generation or updating of the model can be performed off-line, or independent of the operation of the polishing apparatus.

The improved process model can then be used to generate an improved set of control parameter values for a subsequent substrate. Improvement of the process model by the i-APC module 94 can lead to improved polishing uniformity control by minimizing error between the target material removal profile and the actual profile realized on the substrate.

The i-APC module 94 performs tasks including collecting and processing of data from processed wafers to improve processing of future wafers. Collected data can include upstream and downstream metrology data of the product wafers from various wafer metrology tools ("monitoring systems"). Upstream metrology data may include thickness map and associated GOF values of a deposited layer. Downstream metrology data may include a thickness map and associated GOF values of the polished layer, or surface roughness values. The GOF values can be used by the i-APC module 94 to determine whether the thickness value are reliable enough to be used in the process model development. The i-APC module 94 pairs these data with the control and state parameters used during the processing of a particular wafer, and stores it in a data log. The data log may be organized in a variety of ways, including grouping by wafer ID, design ID, lot ID, tool ID, etc. This data log is typically used to monitor trends and drifts in the behavior of a CMP process and to take corrective actions. Due to their size, data logs may be stored in one or more servers that are a part of the controller 90.

In some implementations, the i-APC module 94 stores a desired thickness profile for each wafer to be processed. Using the desired thickness profile, the i-APC module 94 can generate the target material removal profile by subtracting a desired thickness profile from the thickness map of the deposited layer.

A process model can be generated in various ways. For example, a process model for describing the effects of chamber pressures can be generated by processing multiple blanket wafers, which are un-patterned wafers with a uniform layer of a film to be polished, as a proxy for product wafers that have patterns. By polishing the blanket wafers for a fixed amount of time and measuring the resulting material removal profile, a relationship between a set of chamber pressures and a material removal rate can be determined using the Preston equation.

The Preston equation states:

$$\text{Material removal rate (MRR)} = K_p * V * P \qquad \text{Equation 1}$$

where V is the velocity of the polishing pad surface with respect to the substrate surface being polished, P is the pressure applied to a radial zone of a wafer to be polished against the polishing pad, and $K_p$ is a proportionality constant known as the Preston coefficient. The velocity, pressure, and polish time are known and controlled variables, so $K_p$ of each zone can be determined with algebraic manipulations. The resulting set of Preston equations containing the Preston coefficients from polishing of blanket wafers is an example of a baseline process model. The i-APC module 94 can then use this baseline process model to generate a set of initial control parameters for processing of subsequent product wafers. While a process model for modeling effects of chamber pressures are discussed, process models for other control parameters can be generated in this manner.

Due to the differences in surface topologies between a blanket wafer and a product wafer, however, the baseline process model might not achieve the target material removal profile on the polished product wafer. In such case, the i-APC 94 attempts to find, through multiple iterations over polishing of multiple product wafers, a set of correction factors ("offsets") for improving the achieved material removal profile on the product wafers. The i-APC module 94 eventually determines, or converges on, offsets that can be used with the baseline process model for polishing the product wafer. However, such the determination of the offsets can take polishing of multiple product wafers, during which the polished wafers are less likely to meet the target removal profile thus more likely to be rejected, adversely impacting yield of the polishing process.

Consumption of product wafers for offset convergence should be minimized as they are valuable, expensive, and limited in quantity. One way of reducing the number of rejected product wafers until offset convergence is reached is to provide an improved process model that more completely and accurately captures the effects of various process parameters. In some implementations, the i-APC module 94 is configured to provide the improved process model. One way of improving the quality of the process model is to implement a process model that takes in as inputs (1) target material removal profile and (2) state parameters that reflect the conditions of the polishing apparatus, and outputs a set of estimated control parameters (e.g. chamber pressures) that would achieve the target material removal profile.

The material removal rate is influenced by state parameters 114 of the polishing apparatus such as the life, or age, of various consumables due to their wear. For example, the polishing pad may experience a reduction in elasticity or a reduction in surface roughness due to aging. The retaining ring may get polished away during the CMP process, becoming thinner. The polishing pad conditioning disc may become dull and have reduced capacity for pad conditioning. These changes to characteristics of the consumables can affect the polishing behavior. Therefore, wafers with an identical design may require different sets of control parameters for different state parameters to achieve the target material removal profile. Therefore, incorporating state parameters into the process model can lead to better control parameter estimation.

A neural network can be used to model behavior (e.g., removal profile) of a semiconductor processing system (e.g., a CMP system) in response to the process parameters. The neural network is based on a large collection of simple neural units (artificial neurons). Each individual neural unit computes a respective output, or activation, using a summation function. There may be a threshold function or limiting function on each connection and on the unit itself, such that the signal must surpass the limit before propagating to other neurons. Such threshold function may include a hyperbolic tangent or a sigmoid function.

A neural network is trained, rather than explicitly programmed. In other words, a neural network does not require a priori knowledge of the functional dependence of the process being modeled. Instead, the neural network can be trained by providing it with a sufficiently large and representative set of training data; this technique is called supervised machine learning. Because a neural network can excel at modeling complex relationships between inputs and the outputs that are difficult to express in functional relationships, it can provide significant advantages for control of a semiconductor processing system, such as a CMP system.

Figure 3:
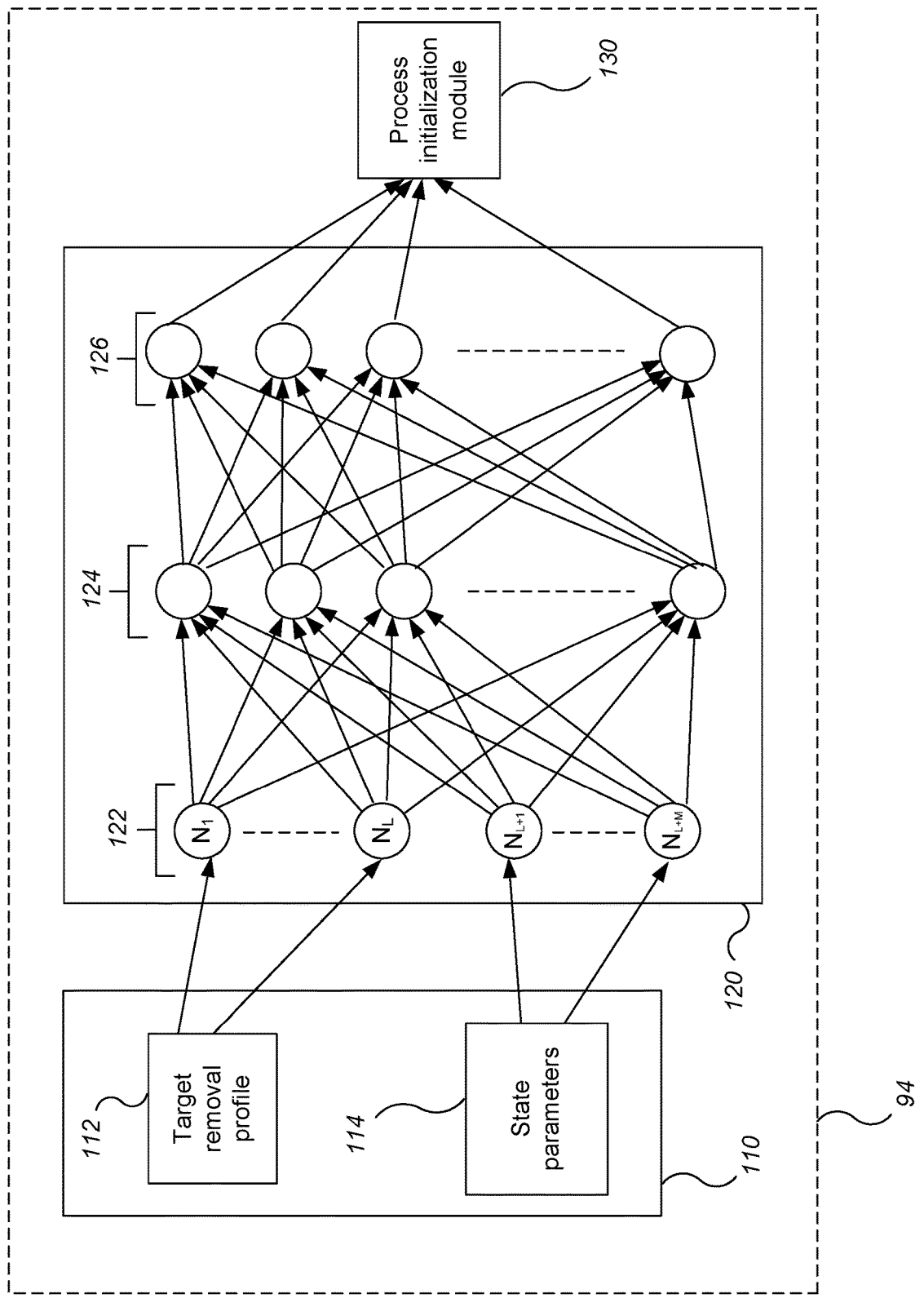
FIG. 3 illustrates a neural network used as part of the integrated advanced process control module of the polishing apparatus.

FIG. 3 illustrates the functional blocks implemented by the i-APC module 94. The i-APC module 94 includes neural network input variable set 110, which includes target removal profile 112 and state parameters 114, a neutral network 120, and a process initialization module 130 that initializes the tool control module 92 of a semiconductor processing system, e.g., a CMP tool, with the output of the neural network. These functional blocks can be distributed across multiple computers.

The neutral network 120 includes a plurality of input nodes 122 for each input variable from neural network input variable set 110, a plurality of hidden nodes 124 (also called "intermediate nodes" below), and a plurality output nodes 126 that will generate the process parameters to be used for initialization. In a neural network having a single layer of hidden nodes, each hidden node 124 can be coupled to each input node 122, and each output node 126 can be coupled to each hidden node 124.

In general, a hidden node 124 outputs a value that is a non-linear function of a weighted sum of the values from the input nodes 122 to which the hidden node is connected.

For example, the output of a hidden node 124, designated node k, can be expressed as:

$$\tan h(0.5 * a_{k1}(I_1) + a_{k2}(I_2) + \ldots + a_{kM}(I_M) + b_k) \quad \text{Equation 2}$$

where tan h is the hyperbolic tangent, a is a weight for the connection between the $k^{th}$ intermediate node and the $x^{th}$ input node (out of M input nodes), and $I_M$ is the value at the $M^{th}$ input node. However, other non-linear functions can be used instead of tan h, such as a rectified linear unit (ReLU) function and its variants, or a sigmoid function.

Figure 4:
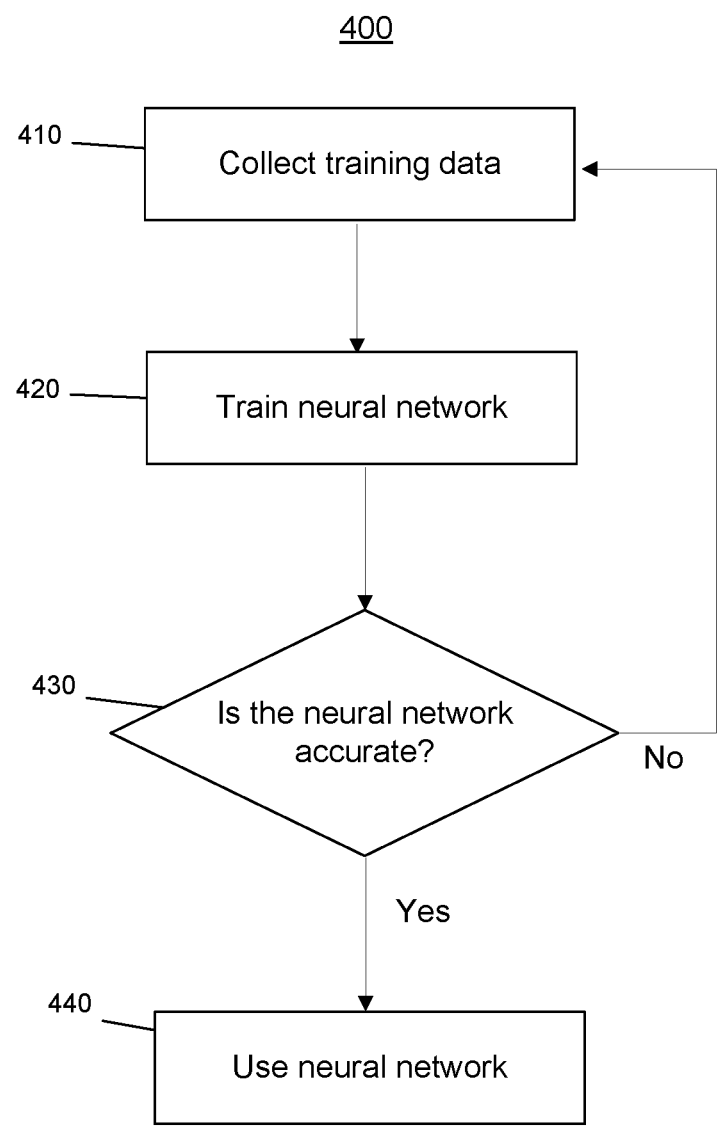
FIG. 4 illustrates an example process for using a neural network model in a CMP process.

FIG. 4 illustrates an example process 400 for training and using a neural network model in a CMP process. The neutral network 120 need to be configured before being used to generate baseline control parameters. The neural network 120 may be configured through training by using various methods of supervised learning. One example of supervised learning method is backpropagation, the use of forward stimulation to reset weights on the 'front' neural units, or input nodes 122.

Before the neural network can be trained, the i-APC control module 94 collects sufficient amount of training data (410). The training data comprises a set of input and output pairs that have been measured, and therefore known to be true. For example, data log maintained by the i-APC control module 94 can be used to retrieve for each substrate, the state parameters 114 during the process; the target removal profile 112; the control parameters used during the process; and the measured removal profile. The retrieved information is then analyzed to determine its suitability as a training example. In the current example, the measured removal profile is compared with the target profile. If the difference between the two is sufficiently small to be within the specification of the process, the data is determined to be a suitable training example. However, it should be noted that the CMP polish behavior may vary substantially between substrates with different designs. Therefore, it may be beneficial to further categorize the training data into different die designs to be used for creating design-specific neural networks. Once a sufficient amount of such training examples have been collected, the training begins.

The i-APC control module 94 trains the neural network 120 (420), e.g., by backpropagation. Backpropagation is a two phase cycle of propagation and weight update. During the propagation cycle, the input vector (e.g. target removal profile and state parameters from a training example) presented to the network is propagated forward through the network, layer by layer, until it reaches the output layer. The output of the network is then compared to the recorded output (e.g. control parameter from a training example) using a cost function, and an error value is calculated for each of the neurons in the output layer. A cost function or loss function is a function that maps values of one or more variables onto a real number intuitively representing some 'cost' associated with the event. The error values are then propagated backwards, starting from the output, until each neuron has an associated error value which roughly represents its contribution to the original output. Backpropagation uses these error values to calculate the gradient of the loss function with respect to the weights in the network. Then in the weight update phase, back propagation method uses these error values to update the weights, in an attempt to minimize the loss function.

The i-APC control module 94 determines whether the trained neural network is accurate (430). After the training phase 420 is completed, the neural network's accuracy should be verified. Verification of the accuracy, for example, may include operating the neural network in its inference mode, feeding it with previously used training input, and determining whether the output is in agreement, or is sufficiently close to the correct output in the training data. If the neural network output is not sufficiently accurate, then the process returns to step 410 to collect additional training data. If the output is accurate, then the neural network is ready to be used.

The i-APC control module 94 uses the trained neural network (440) to generate process parameters. In inference mode, the neural network outputs process parameters to be used for initialization in response to target material removal profile 112 and state parameters 114.

In some implementations, individual neural network is generated and trained for each wafer design. In such implementations, the i-APC control module 94 maintains a library of neural networks, and the controller selects a neural network trained for the current wafer design to initialize the process.

The architecture of the neural network 120 can vary in depth and width. For example, although the neural network 120 is shown with a single column of intermediate nodes 124, it can include multiple columns. The number of intermediate nodes 124 can be equal to or greater than the number of input nodes 122.

Figure 5:
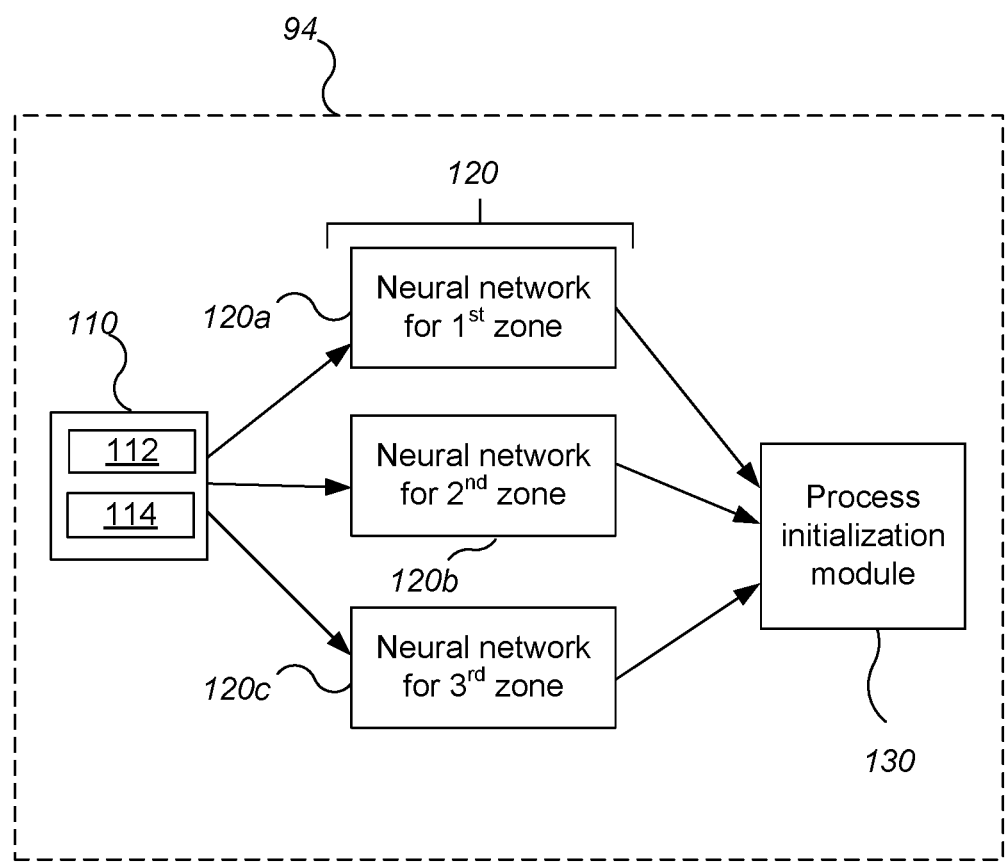
FIG. 5 illustrates an integrated advanced process control module that includes multiple neural networks.

In some implementations, referring to FIG. 5, the i-APC control module 94 can be configured to have multiple neural networks 120. The neural networks 120 can operate in parallel to generate the chamber pressure values for each zones. The number of neural networks can match the number of zones. For example, there can be a first neural network 120a for the first zone 12a, a second neural network 120b for the second zone 12b and a third neural network 120c for the third zone 12c. The output of each neural network 120 can be fed to the process initialization module 130.

The training of the neural network can be computationally intensive. Accordingly, in some implementations, training of the neural network may be done off-line, e.g., while the CMP tool is undergoing maintenance. In other implementations, the training can be done on a separate server that is part of the controller 90. In some other implementations, the training can be done in a server that is not part of the controller 90, which provides the pre-trained neural network to the controller.

The behavior of a CMP process may slowly change over time for reasons that are not factored in (e.g. wear of parts that are not considered consumables) by the input variables of the neural network. Therefore, in some implementations, a periodic retraining of the neural network may be performed to overcome such changes.

Embodiments and all of the functional operations described in this specification can be implemented in digital electronic circuitry, or in computer software, firmware, or hardware, including the structural means disclosed in this specification and structural equivalents thereof, or in combinations of them. Embodiments can be implemented as one or more computer program products, i.e., one or more computer programs tangibly embodied in a machine readable storage media, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The above described polishing apparatus and methods can be applied in a variety of polishing systems. Either the polishing pad, or the carrier heads, or both can move to provide relative motion between the polishing surface and the substrate. For example, the platen may orbit rather than rotate. The polishing pad can be a circular (or some other shape) pad secured to the platen. The polishing system can be a linear polishing system, e.g., where the polishing pad is a continuous or a reel-to-reel belt that moves linearly. The polishing layer can be a standard (for example, polyurethane with or without fillers) polishing material, a soft material, or a fixed-abrasive material. Terms of relative positioning are used relative orientation or positioning of the components; it should be understood that the polishing surface and substrate can be held in a vertical orientation or some other orientation with respect to gravity.

Particular embodiments have been described. Other embodiments are within the scope of the following claims.

What is claimed is:

1. A method of polishing substrates, comprising:
subjecting each respective first substrate of a first plurality of substrates to a polishing process that modifies a thickness of an outer layer of the respective first substrate;
for each respective first substrate, recording a group of polishing process parameter values used for the polishing process, thus generating a plurality of groups of polishing process parameter values, and recording at least one state parameter value used for the polishing process, thus generating a plurality of state parameter values;

for each respective first substrate, measuring a removal profile of the outer layer during or after the polishing process with a monitoring system, thus generating a plurality of removal profiles;

training an artificial neural network by backpropagation using the plurality of groups of polishing process parameter values, the plurality of state parameter values, and the plurality of removal profiles as training data, the artificial neural network having a plurality of input nodes with at least two of the input nodes configured to receive respective removal values from the removal profile and one or more of the input nodes configured to receive one or more state parameter values, a plurality of output nodes to output control parameter values, and a plurality of hidden nodes connecting the input nodes to the output nodes;

for each respective second substrate of a second plurality of substrates, determining a target removal profile and an operating state parameter value, wherein the target removal profile is a radially-dependent desired change in thickness of a layer on the substrate due to the polishing process;

for each respective second substrate, determining respective control parameter values to apply to the respective second substrate from the output nodes of the artificial neural network by applying the target removal profile and the operating state parameter value for the respective second substrate to the input nodes of the artificial neural network; and subjecting each respective second substrate to the polishing process using the respective control parameter values, wherein the respective control parameter values comprises pressures of chambers in a carrier head to hold a substrate against a polishing pad.

2. The method of claim 1, wherein the polishing process comprises chemical mechanical polishing.

3. The method of claim 2, wherein the respective control parameter values comprise one or more of a platen rotation rate, carrier head rotation rate, or polishing time.

4. The method of claim 2, wherein the plurality of state parameter values comprise one or more of a retaining ring life, or a polishing pad life.

5. The method of claim 1, wherein the monitoring system comprises an in-line metrology system.

6. The method of claim 5, wherein the in-line metrology system comprises an optical monitoring system.

7. The method of claim 1, wherein determining the target removal profile comprises storing a desired thickness profile, receiving a measured thickness profile of the respective second substrate, and determining a difference between the measured thickness profile and the desired thickness profile.

8. The method of claim 7, wherein receiving the measured thickness profile comprises measuring a thickness profile of the respective second substrate with the monitoring system.

\* \* \* \* \*